(No Model.)

G. T. DUNN.
BOOK.

No. 438,067. Patented Oct. 7, 1890.

Witnesses

Inventor
George T. Dunn.
By his Attorneys
Higdon & Higdon

UNITED STATES PATENT OFFICE.

GEORGE T. DUNN, OF ST. LOUIS, MISSOURI, ASSIGNOR TO THE R. & T. A. ENNIS STATIONERY COMPANY, OF SAME PLACE.

BOOK.

SPECIFICATION forming part of Letters Patent No. 438,067, dated October 7, 1890.

Application filed June 23, 1890. Serial No. 356,440. (No model.)

*To all whom it may concern:*

Be it known that I, GEORGE T. DUNN, of St. Louis, in the State of Missouri, have invented certain new and useful Improvements in Books, of which the following is a full, clear, and exact description, reference being had to the accompanying drawings, forming a part thereof.

My invention relates to improvements in books; and it consists of sheets folded upon themselves, creases formed in the said leaves adjacent to the fold, and means whereby the said leaves are united to form a book, which when opened will present a flat surface, the details of which will be hereinafter fully described, and designated in the claim.

Figure 1:
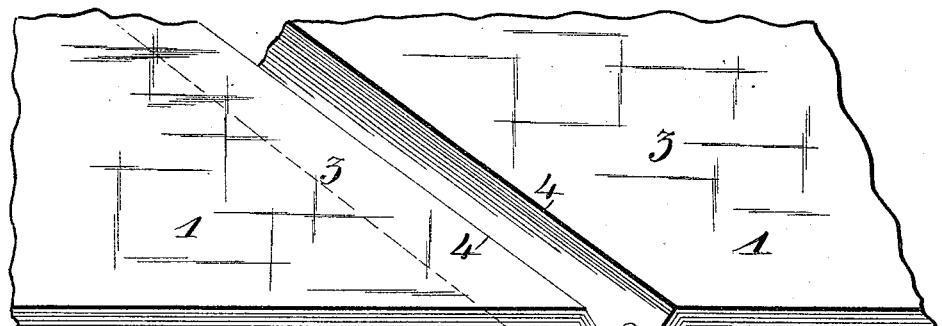
Figure 2:
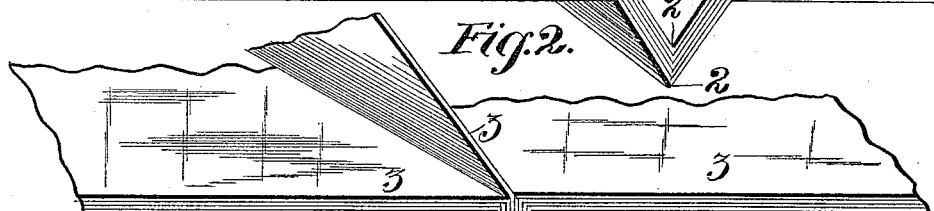
Figure 3:
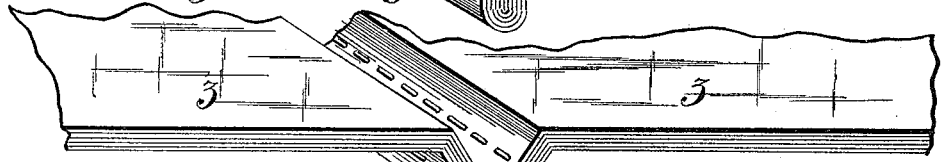
Figure 4:
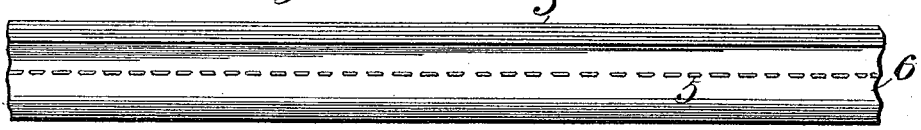
Figure 5:
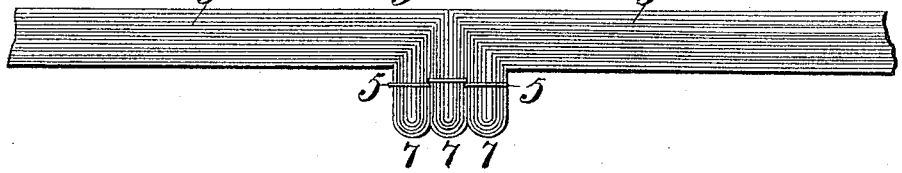

In the drawings, Figure 1 is a perspective view of a number of leaves creased according to my invention. Fig. 2 is a perspective view of the same sewed together. Fig. 3 is a perspective view of a modification of my invention. Fig. 4 is a side elevation of the same, and Fig. 5 is an end view of a number of sections in position to be united to a cover to form a book.

Referring to the drawings, 1 represents a sheet folded at 2 to form two leaves 3 3, a suitable number of them being united together to form sections, which sections, when a sufficient number are bound together, form a book. Near the adjacent fold 2 of the leaves 3 are formed creases 4, which when open form a flat and uninterrupted surface, as shown in Fig. 5.

6 represents a stub formed by the fold 2 and creases 4, and the said stub stitched at 5 for uniting the several leaves or sections formed thereby together.

In the modification shown in Fig. 3 the stubs 6 of the leaves are sewed independent of each other, by means of which the book may be bound in the well-known manner, or in a different way to that shown in Fig. 2.

7 represents independent sections, shown in connection with one another to form a book, as illustrated in Fig. 5.

A book constructed according to my invention will present when open at any position a comparatively flat surface, which is produced by the creases 4 formed in the leaves 3, as will be fully seen, and, moreover, by uniting the stubs between the central fold and the adjacent creases the book is rendered more durable than it would be were the leaves stitched at their junction with the stubs.

Having fully described my invention, what I claim is—

The herein-described book, consisting of sheets folded to form leaves, creases formed in the said leaves adjacent to the said fold forming stubs, and the said stubs stitched midway between the folds and creases for uniting the several leaves to form a book, as and for the purpose described.

In testimony whereof I affix my signature in presence of two witnesses.

GEORGE T. DUNN.

Witnesses:
L. H. CHAPMAN,
E. S. FISK.